(12) United States Patent
Junge et al.

(10) Patent No.: US 8,597,849 B2
(45) Date of Patent: Dec. 3, 2013

(54) PRESSURE ACTIVATED SHUT-OFF VALVE

(75) Inventors: Axel Junge, Mainz (DE); Rainer Immel, Dexheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 2040 days.

(21) Appl. No.: 11/215,151

(22) Filed: Aug. 30, 2005

(65) Prior Publication Data
US 2007/0048565 A1 Mar. 1, 2007

(51) Int. Cl.
*H01M 8/04* (2006.01)
*F16K 31/06* (2006.01)
*F16K 31/12* (2006.01)

(52) U.S. Cl.
USPC ... 429/446; 429/444; 137/625.65; 251/30.01; 251/30.02

(58) Field of Classification Search
USPC ..................................... 429/25, 34; 251/30.01
See application file for complete search history.

(56) References Cited

U.S. PATENT DOCUMENTS

| | | | | |
|---|---|---|---|---|
| 3,470,910 A | * | 10/1969 | Loveless | 137/625.6 |
| 4,584,980 A | * | 4/1986 | Weiger et al. | 123/458 |
| 4,706,930 A | * | 11/1987 | Lexen | 251/26 |
| 5,058,624 A | * | 10/1991 | Kolze | 137/607 |
| 5,357,999 A | * | 10/1994 | Loth et al. | 137/81.2 |
| 6,142,442 A | * | 11/2000 | Carroll | 251/30.02 |
| 6,395,414 B1 | * | 5/2002 | Clingerman et al. | 429/17 |
| 6,457,696 B1 | * | 10/2002 | Hirota | 251/30.02 |
| 6,464,854 B2 | * | 10/2002 | Andrews et al. | 205/628 |
| 6,537,692 B1 | * | 3/2003 | Horiguchi et al. | 429/413 |
| 6,769,418 B1 | * | 8/2004 | Reddy | 123/520 |
| 6,857,618 B2 | * | 2/2005 | Ludwig et al. | 251/30.01 |
| 6,984,464 B2 | * | 1/2006 | Margiott et al. | 429/12 |
| 2004/0182951 A1 | * | 9/2004 | Boehland | 239/88 |
| 2006/0124182 A1 | * | 6/2006 | Kim | 137/625.65 |

* cited by examiner

*Primary Examiner* — Cynthia K. Walls
(74) *Attorney, Agent, or Firm* — John A. Miller; Miller IP Group, PLC

(57) ABSTRACT

A shut-off valve for opening and closing a cryogenic tank that has particular application for a hydrogen consuming system, such as a fuel cell system or an internal combustion engine. The shut-off valve is positioned in a supply line coupled to the cryogenic tank, and is opened by a control valve. When the control valve is actuated, hydrogen pressure from the supply line is used to open the shut-off valve. The control valve is coupled to the output line either upstream or downstream of the shut-off valve. An output of the control valve can be vented to a cathode input, an anode input or a cathode exhaust of a fuel cell stack, to an air input of an internal combustion engine or to ambient, depending on the particular application.

26 Claims, 2 Drawing Sheets

US 8,597,849 B2

PRESSURE ACTIVATED SHUT-OFF VALVE

BACKGROUND OF THE INVENTION

1. Field of the Invention

This invention relates generally to a pressure activated shut-off valve and, more particularly, to a pressure activated shut-off valve for a cryogenic hydrogen storage tank where the hydrogen pressure in the tank is used to open the valve.

2. Discussion of the Related Art

Hydrogen is a very attractive fuel because it is clean and can be used to efficiently produce electricity in a fuel cell. The automotive industry expends significant resources in the development of hydrogen fuel cells and hydrogen operated internal combustion engines as a source of power for vehicles. Such vehicles would be more efficient and generate fewer emissions than today's vehicles employing hydrocarbon operated internal combustion engines.

In an automotive fuel cell application, the hydrogen is sometimes stored in a cryogenic tank on the vehicle, where the hydrogen is a liquid at very cold temperatures, such as −253° C. The cryogenic tank typically includes an inner tank and an outer tank with a vacuum and a multi-insulation (MLI) layer therebetween to limit heat penetration into the inner tank to maintain the liquid hydrogen in its super cold state.

A cryogenic shut-off valve is typically provided in a supply line from the tank that is opened during operation of the fuel cell system to provide hydrogen thereto, and is closed when the system is shut-down. Because the liquid hydrogen is very cold, certain design requirements need to be addressed so that the valve does not leak at such low temperatures created by the liquid hydrogen flowing through the valve during vehicle operation. When the system is not drawing hydrogen from the tank and the cryogenic shut-off valve is closed, then the valve may warm up to ambient temperatures. Thus, high forces are required to maintain the shut-off valve in the closed position to prevent leakage over a wide range of temperatures.

Shut-off valves of the type discussed above should provide for the precise opening and closing of the hydrogen supply line, minimal part count, minimal power requirements, minimal heat intrusion into the tank and fail-safe operation.

Electromagnetic valves are one known option for cryogenic shut-off valves of this type. A large spring holds the valve in the closed position with enough force to prevent hydrogen leaks, as discussed above. However, because of the large forces required to maintain the valve in the open position against the bias of the spring, the electromagnet requires a lot of energy. Also, the size and weight of a large electromagnet is a design concern. Certain electromagnetic shut-off valves utilize a pilot pressure to reduce the opening force of the valve. However, such valves require two seat surfaces that may significantly increase the potential for leakage.

It is known to overcome some of the limitations of an electromagnetically actuated valve by providing a pneumatically actuated valve that uses air pressure to open the shut-off valve against the spring force. The pneumatic actuated valve requires an air compressor that provides the air pressure to open the valve against the spring force. Pneumatically controlled valves do not have the drawbacks of the electromagnetically control valves that require high currents, but do have other design concerns that need to be addressed. These concerns include the requirement of a compressor, humidity control for preventing freezing, filtering dust particles, etc.

SUMMARY OF THE INVENTION

In accordance with the teachings of the present invention, a shut-off valve for opening and closing a cryogenic tank is disclosed that has particular application for a hydrogen consuming system, such as a fuel cell system or an internal combustion engine. The shut-off valve is positioned in a supply line coupled to the cryogenic tank, and is opened by a control valve. When the control valve is actuated, hydrogen pressure from the supply line is used to open the shut-off valve. The control valve is coupled to the output line either upstream or downstream of the shut-off valve. An output of the control valve can be vented to a cathode input, an anode input or a cathode exhaust of a fuel cell stack, to an air input of an internal combustion engine or to ambient, depending on the particular application.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a pressure activated cryogenic shut-off valve for a hydrogen consuming system is merely exemplary in nature, and is in no way intended to limit the invention or its applications or uses.

Figure 1:
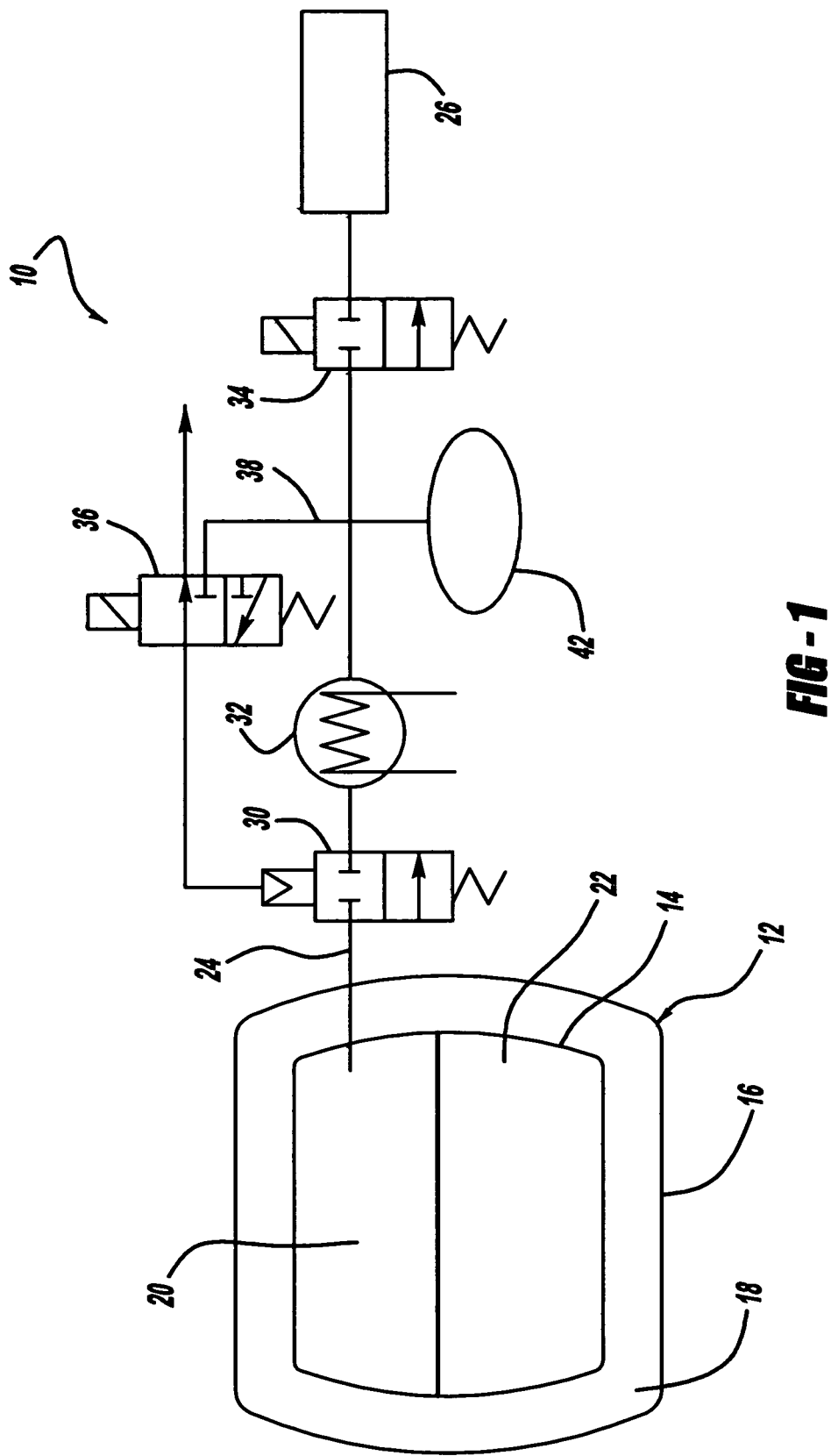
FIG. 1 is a schematic plan view of a hydrogen consuming system employing a cryogenic shut-off valve, according to an embodiment of the present invention.

FIG. 1 is a schematic plan view of a hydrogen consuming system 10. The system 10 includes a liquid hydrogen tank assembly 12 for storing liquid hydrogen at cryogenic temperatures. The tank assembly 12 includes an inner tank 14, an outer tank 16 and a super-insulation 18 therebetween. The super-insulation 18 typically consists of a vacuum and a number of radiation shields, sometimes referred to as multi-layer insulation (MLI). Hydrogen is stored in the inner tank 14 in a gaseous state 20 and a liquid state 22. The temperature of the liquid hydrogen 22 within the inner tank 14 is typically about −253° C., and is kept at this temperature by the super-insulation 18. Gaseous hydrogen from the tank assembly 12 is output from the inner tank 14 on a supply line 24 to be used by a hydrogen consuming device 26. The hydrogen consuming device 26 is intended to represent any suitable device, such as a fuel cell stack or an internal combustion engine.

According to the invention, the system 10 includes a cryogenic shut-off valve 30 positioned within the line 24 for opening the line 24 during operation of the device 26 or for filling the tank assembly 12. In this embodiment, the valve 30 is outside of the tank assembly 12. However, in other embodiments, the valve 30 can be positioned in the super-insulation 18. As will be discussed in detail below, hydrogen pressure in the line 24 is used to open the valve 30 against the bias of a spring. In this manner, the valve 30 operates similar to a pneumatically controlled valve without the requirement of a compressed air source. The system 10 also includes a heat exchanger 32 that heats the hydrogen flowing through the line 24 downstream of the cryogenic shut-off valve 30. The warm hydrogen is then sent through a tank shut-off valve 34, which is a redundant shut-off valve for opening the line 24, but does not have to be a cryogenic shut-off valve.

A control valve 36 controls the shut-off valve 30 using the hydrogen pressure in the line 24. In this non-limiting embodiment, the control valve 36 is coupled to the line 24 downstream of the shut-off valve 30 by a line 38. When the shut-off valve 30 is in the closed position, as shown in FIG. 1, the control valve 36 is vented to a suitable location that can take a minimal amount of hydrogen that may be present during the transition of the valves 30 and 36, such as the anode or cathode input of a fuel cell stack, the cathode exhaust of the fuel cell stack, an input to an internal combustion engine or ambient. The control valve 36 can be an electromagnetically controlled valve because minimal force is required to open the valve 36. Hydrogen pressure in the line 24 between the heat exchanger 32 and the tank shut-off valve 34 is used to open the shut-off valve 30. A pressure accumulator 42 can be coupled to the line 24 between the heat exchanger 32 and the tank shut-off valve 34 to provide additional pressure in the event that the pressure in the line 24 is not enough to maintain the shut-off valve 30 in the open position. The pressure accumulator 42 may not be required in some designs.

Figure 2:
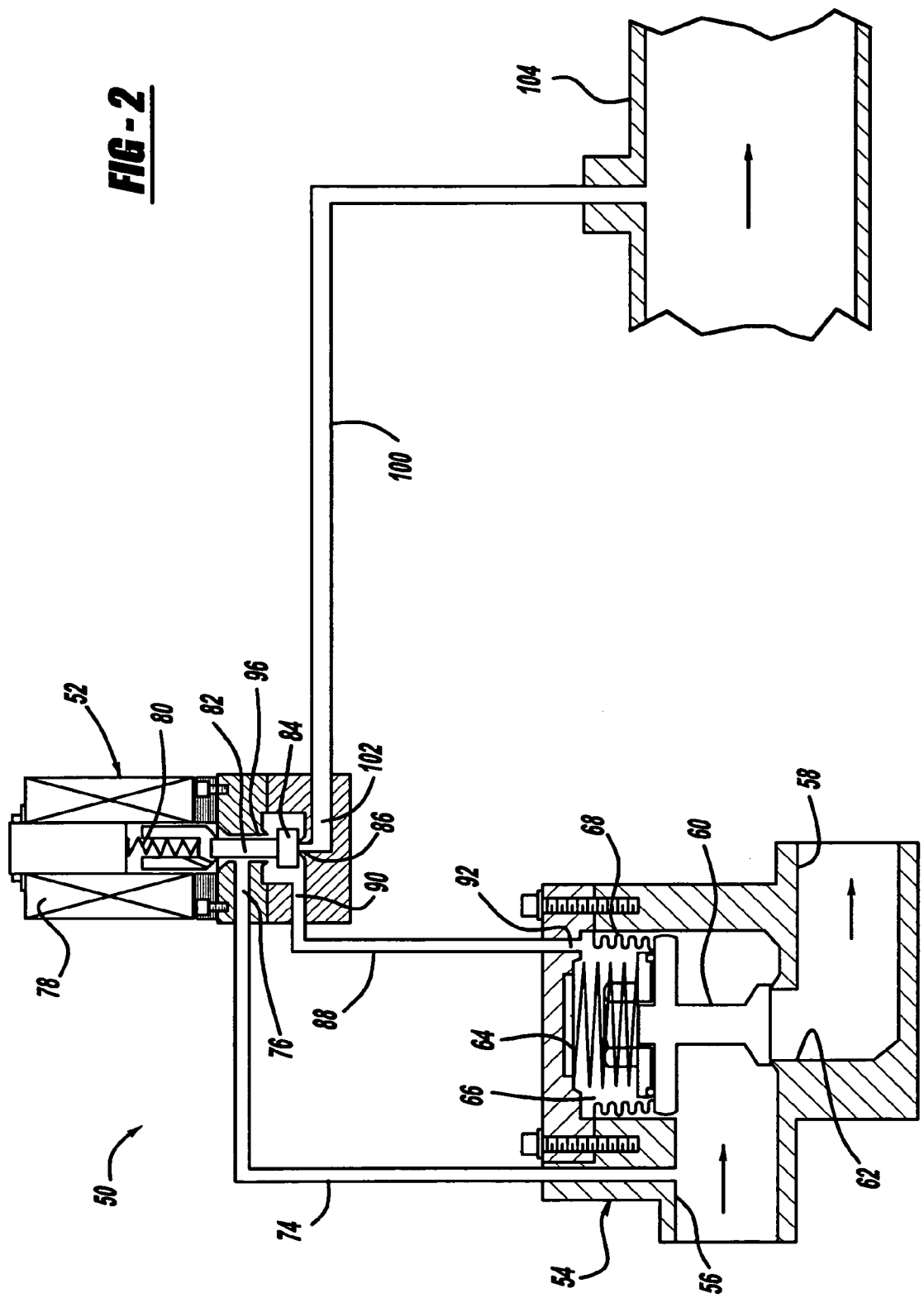
FIG. 2 is a cross-sectional view of a cryogenic shut-off valve and a control valve for use in the system shown in FIG. 1, according to another embodiment of the present invention.

FIG. 2 is a cross-sectional view of a valve system 50 including a control valve 52 and a cryogenic shut-off valve 54 that can replace the control valve 36 and the shut-off valve 30, respectively, in the system 10, according to another embodiment of the present invention. Hydrogen from the tank assembly 12 flows into the shut-off valve 54 through an inlet port 56 and out of the shut-off valve 54 through an outlet port 58. A valve seat 60 is provided within the valve 54 that opens and closes an opening 62 to block the flow between the ports 56 and 58 or allow flow between the ports 56 and 58. A spring 64 biases the valve seat 60 in the closed position, as shown in FIG. 2. The spring 64 is positioned within a bellows chamber 66 defined by a bellows 68 that allows the valve seat 60 to move up and down, as will be discussed in further detail below.

In this embodiment, hydrogen pressure from the tank assembly 12 upstream of the valve 54 is used to open the shut-off valve 54 instead of the line pressure downstream of the shut-off valve 30 in the embodiment shown in FIG. 1. Particularly, an input line 74 is provided between the inlet port 56 and an inlet port 76 of the control valve 52. Because the line 74 can be a narrow diameter line, the force required to open the control valve 52 is minimal. Therefore, the control valve 52 can be an electromagnetic control valve controlled by an electromagnetic coil 78.

The control valve 52 includes a spring 80 that biases a valve shaft 82 including a valve seat 84 to close an opening 86. When the control valve 52 is not energized, the spring 80 forces the valve seat 84 to close the opening 86 so that the input line 74 is in fluid communication with a control line 88 coupled to a control port 90 of the control valve 52 through an opening 96 and a control port 92 of the shut-off valve 54. The control port 92 is in fluid communication with the bellows chamber 66 so that the pressure in the chamber 66 and the input pressure at the inlet port 56 are the same. Thus, the fluid pressure on both sides of the valve seat 60 is the same, which allows the spring 64 to close the opening 62.

When the coil 78 is energized, magnetic forces cause the valve seat 84 to lift off of the opening 86 and close the opening 96. When the valve seat 84 is in this position, the control line 88 is in fluid communication with an exhaust line 100 through an outlet port 102 of the control valve 52. The exhaust line 100 is coupled to an outlet device 104 that is at a lower pressure than the tank pressure. Therefore, the bellows chamber 66 vents to the device 104 through the exhaust line 100, thus reducing the pressure in the chamber 66. The reduction of the pressure in the chamber 66 causes the pressure at the inlet port 56 to push up against the valve seat 60 and the spring 64 to open the opening 62. As discussed above, the input line 74 can be connected to the outlet port 58 rather than to the input port 56 to operate in the same manner.

The device 104 can be any suitable device that is at a lower pressure than the tank pressure and is able to accept a minimal amount of hydrogen, including the anode inlet to a fuel cell stack, the cathode inlet to the fuel cell stack, the cathode exhaust from the fuel cell stack, an air input to an internal combustion engine, ambient, etc. If the device 104 is a higher pressure device, such as the fuel cell stack, then the valve 54 can be designed accordingly where the pressure difference between the chamber 66 and the inlet port 56 would be less, such as by providing a larger sized cross-sectional area of the bellows chamber 66. Further, if the hydrogen consuming device 26 is an internal combustion engine, then the device 104 could be the air inlet of the engine.

By using the hydrogen in the tank assembly 12 instead of an external air supply to actuate the shut-off valves 30 and 54, a number of advantages are achieved. These advantages include the elimination of the air compressor and the various components, such as filters, that are required with such a design. Additionally, because the control valves 30 and 54 are gas controlled, there is a high closing force. Further, minimal electrical energy is required to operate the control valves 36 and 52 because the coils are relatively small. Also, the configuration of the shut-off valves 30 and 54 provides an increased thermal isolation. Additionally, even though the shut-off valves 30 and 54 are in the cryogenic environment, precautions are not needed to prevent air from freezing because it is the hydrogen that is doing the actuation. Also, because air has humidity, using the hydrogen as the actuating pressure eliminates those concerns.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for delivering a fuel from a tank to a fuel consuming device, said system comprising:
   a supply line configured to receive the fuel within the tank;
   a shut-off valve positioned within the supply line such that fuel from the tank flows into the shut-off valve through an inlet port and out of the shut-off valve through an outlet port, the shut-off valve including a valve seat biased by a spring that operates to open and close an opening between the inlet port and the outlet port of the shut-off valve to close and open the supply line, the spring being positioned within a bellows that defines a bellows chamber; and
   a control valve coupled in fluid communication with the shut-off valve through an input line and a control line, the input line being in fluid communication with the supply line through the inlet port of the shut-off valve, and the control line being in fluid communication with the bellows chamber through a control port in the shut-off valve;
   wherein the control valve is configured to open the shut-off valve by reducing the fuel pressure in the bellows chamber.

2. The system according to claim 1 wherein the control valve receives the fuel pressure from the supply line downstream of the shut-off valve.

3. The system according to claim 1 wherein the control valve receives the fuel pressure from the supply line upstream of the shut-off valve.

4. The system according to claim 1 wherein fuel within the shut-off valve is vented to a fuel consuming apparatus through the control valve.

5. The system according to claim 4 wherein the fuel consuming device and the fuel consuming apparatus are a fuel cell stack and wherein the vented fuel from the control valve is vented to an anode input side of the fuel cell stack.

6. The system according to claim 4 wherein the fuel consuming apparatus and the fuel consuming device are a fuel cell stack, and wherein the vented fuel from the control valve is vented to a cathode input side of the fuel cell stack.

7. The system according to claim 4 wherein the fuel consuming apparatus and the fuel consuming device are a fuel cell stack, and wherein the vented fuel from the control valve is vented to a cathode exhaust of the fuel cell stack.

8. The system according to claim 4 wherein the fuel consuming apparatus and the fuel consuming device are an internal combustion engine, and wherein the vented fuel from the control valve is vented to an air inlet of the internal combustion engine.

9. The system according to claim 4 wherein the fuel consuming apparatus and the fuel consuming device are an internal combustion engine, and wherein the vented fuel from the control valve is vented to an exhaust of the internal combustion engine.

10. The system according to claim 1 wherein the fuel is hydrogen, the tank is a liquid hydrogen storage tank and the shut-off valve is a cryogenic shut-off valve.

11. The system according to claim 10 wherein the tank is a tank assembly including an inner tank and an outer tank with a vacuum and a multi-layer-insulation (MLI) therebetween.

12. The system according to claim 11 wherein the shut-off valve is positioned in the supply line outside of the tank assembly.

13. The system according to claim 11 wherein the shut-off valve is positioned in the supply line within the vacuum and MLI.

14. The system according to claim 1 further comprising a pressure accumulator in fluid communication with the supply line downstream of the shut-off valve, said pressure accumulator providing additional pressure to the control valve to open the shut-off valve.

15. The system according to claim 1 wherein the control valve is an electromagnetically controlled control valve.

16. A fuel cell system comprising:
a fuel cell stack;
a liquid hydrogen storage tank;
a supply line for providing the hydrogen from the tank to the fuel cell stack;
a pressure activated shut-off valve positioned within the supply line for closing and opening the supply line such that hydrogen from the tank flows into the shut-off valve through an inlet port and out of the shut-off valve through an outlet port, the shut-off valve including a valve seat biased by a spring that operates to open and close an opening between the inlet port and the outlet port of the shut-off valve to close and open the supply line, the spring being positioned within a bellows that defines a bellows chamber; and
an electromagnetically activated control valve coupled in fluid communication with the shut-off valve through an input line and a control line, the input line being in fluid communication with the supply line through the inlet port of the shut-off valve, and the control line being in fluid communication with the bellows chamber through a control port in the shut-off valve;
wherein the control valve is configured to use the hydrogen pressure in the bellows chamber to open the shut-off valve.

17. The fuel cell system according to claim 16 wherein the control valve receives the hydrogen pressure from the supply line downstream of the shut-off valve.

18. The fuel cell system according to claim 16 wherein the control valve receives the hydrogen pressure from the supply line upstream of the shut-off valve.

19. The fuel cell system according to claim 16 wherein hydrogen within the shut-off valve is vented to the fuel cell stack through the control valve.

20. The fuel cell system according to claim 19 wherein the vented hydrogen from the control valve is vented to an anode input side of the fuel cell stack.

21. The fuel cell system according to claim 19 wherein the vented hydrogen from the control valve is vented to a cathode input side of the fuel cell stack.

22. The fuel cell system according to claim 19 wherein the vented hydrogen from the control valve is vented to a cathode exhaust of the fuel cell stack.

23. The fuel cell system according to claim 16 further comprising a pressure accumulator in fluid communication with the supply line downstream of the shut-off valve, said pressure accumulator providing additional pressure to the control valve to open the shut-off valve.

24. The system according to claim 1, wherein the control valve is actuated to control a position of a valve seat in the control valve such that an opening at an inlet port of the control valve is closed, and an opening between a control port of the control valve and an outlet port of the control valve is opened, causing the pressure at the inlet port of the shut-off valve to push up against the valve seat in the shut-off valve to open the flow of fuel in the supply line through the shut-off valve.

25. The system according to claim 1, wherein the input line extends from an inlet port of the control valve to the inlet port of the shut-off valve, and the control line extends from a control port of the control valve to a control port in the shut-off valve.

26. The fuel cell system according to claim 16, wherein the control valve includes a valve seat biased by a spring that operates to open and close an opening between the inlet port of the control valve and the control port of the control valve, and an opening between the control port of the control valve and an output port of the control valve.

* * * * *